May 21, 1940.  K. J. MOSEBACH  2,201,497
RAIL BOND
Filed July 14, 1939
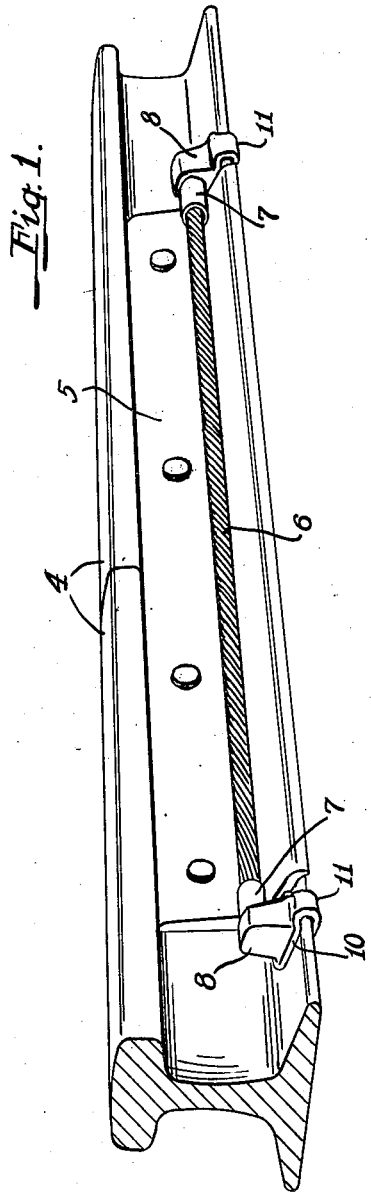
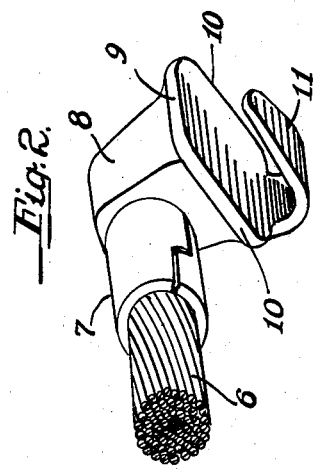
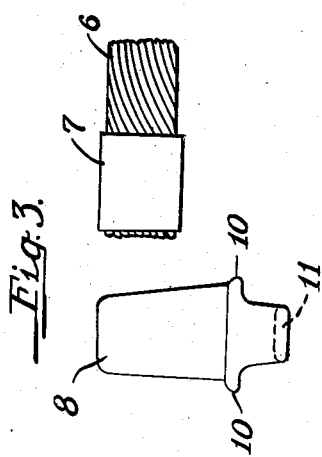
INVENTOR
Karl J. Mosebach,
By Archworth Martin,
Attorney.

Patented May 21, 1940

2,201,497

UNITED STATES PATENT OFFICE 2,201,497

RAIL BOND

Karl J. Mosebach, Pittsburgh, Pa.

Application July 14, 1939, Serial No. 284,469

1 Claim. (Cl. 173—262)

My invention relates to the art of electrically bonding mine track rails, railway track rails, etc., and more particularly to structures which involve conductor cables that bridge the joint between adjacent rail ends, and the terminals for connecting the ends of the cable to the rails.

One object of my invention is to provide a terminal of such form that the cable will be supported close to the side of a splice bar whereby danger of damage thereto is minimized, and of such form that the cable will lie in straight lines and not have to be bent at the ends of the splice bar.

Another object of my invention is to provide terminals of such form that the cable ends may be connected thereto at various heights, in accordance with the thickness of the base flanges of the splice bars at the rail joints.

Still another object of my invention is to provide terminals of such form that they can be removed or broken away from the rails to which they are attached, without the necessity of chiseling or burning their welded connections to the rails.

As shown in the accompanying drawing, Figure 1 is a perspective view of a portion of a track, showing my invention applied thereto; Fig. 2 is a perspective view, on an enlarged scale, of one of the terminals of Fig. 1; and Fig. 3 is an expanded view showing the terminal and the cable end in spaced position preparatory to welding them together.

The track rails are indicated by the numeral 4 and are provided with the usual splice bars or fish plates as indicated at 5. A conductor cable 6, usually of copper, has sleeves or ferrules 7 at its ends, these sleeves suitably being of mild steel and bent into clamping engagement with the ends of the cable.

The terminals 8 may also be of mild steel whose body portions are cast to pyramidal or keystone form. Each terminal has its base extended to form a rear flange portion 9 and side flange portions 10, a rearwardly-projecting tongue 11 being formed on the outermost edge of the terminal to serve as a clip or hook whereby the terminal is aligned and stabilized on the rail base during welding of the terminal to the base.

Previous to placing the bond on the rail, the ends of the cable 6 and their ferrules 7 are welded to the sides of the terminals 8, the members 7 and 8 being engaged by dies or holders which clamp the same and which serve also as electrodes that carry welding current from suitable conductors, the dies or holders being moved toward one another to bring the cable ends and the ferrules into engagement with the sides of the terminals during application of the welding current. The terminals are of such vertical dimension that the cables can be welded thereto at various heights, in accordance with the thickness of the base flanges of the splice bars with which the bonds are to be employed. In this manner the ferrules 7 can be positioned at such vertical points on the terminals as to insure that they will lie directly against the splice bar and be partially supported thereby. Also it will be unnecessary to form any bends in the cable 6. The terminals 8 are of identical form, so that any terminal may be used at either end of a cable, thus avoiding the necessity of making right and left terminals.

The form of the terminals employed and the manner in which the cable is connected thereto avoids the necessity of providing cables of substantially greater length than the splice bars, thus reducing the bond to a minimum length. This reduction in length not only saves several inches of cable as compared to various prior art bonds, but being of shorter length, the danger of damage is correspondingly reduced.

After a cable has been welded to its terminals, the terminals are placed upon the rails in the position shown in Fig. 1, whereupon the flange portions 10 of the terminals are welded to the rail base by the arc welding method, or in some other suitable manner. If desired, the flange portions 9 also will be welded to the rail base. The height of the body portion 8 of each terminal is greater than the combined thickness of the splice bar and the cable, so that not only can the cable be welded to the terminals at different heights, but the height of the terminal is such that the terminal can be broken loose from the rail by inserting a crowbar between the web of the rail and the inner side of the terminal, and utilizing the crowbar as a lever to break the welded connection of the terminal to the rail and pry the terminal from the rail. In case the tongue 11 gets bent during this removal operation, it can be struck with a hammer to bring it to its original position, so that the bond can again be used.

I claim as my invention:

The combination with railway track rails having heads and base flanges, and connected by a splice bar having a base flange, of a bond therefor comprising terminal blocks welded to the upper faces of the rail bases, adjacent to the ends of the splice bar, a cable, and a ferrule surrounding each end of the cable, the cable ends and the ferrules being welded to the adjacent sides of the terminals at such height that the cable is disposed in parallelism with the base flange of the splice bar and so that the ferrules overlie and are directly supported by the adjacent surfaces of the splice bar.

KARL J. MOSEBACH.